United States Patent [19]

Moore

[11] 3,785,803
[45] Jan. 15, 1974

[54] EXTRACTION OF MERCURY FROM ALKALINE BRINES

[75] Inventor: Fletcher L. Moore, Knoxville, Tenn.

[73] Assignee: The United States of America as represented by the United States Atomic Energy Commission, Washington, D.C.

[22] Filed: Mar. 1, 1972

[21] Appl. No.: 231,029

[52] U.S. Cl. .................................. 75/121, 75/101
[51] Int. Cl. ............................................. C22b 43/00
[58] Field of Search ................. 75/101, 121; 423/99

[56] References Cited
UNITED STATES PATENTS 3,083,085   3/1963   Lewis et al. ............................ 75/121
3,085,859   4/1963   Scholten et al. ....................... 75/121

Primary Examiner—Oscar R. Vertiz
Assistant Examiner—S. B. Shear
Attorney—John A. Horan

[57] ABSTRACT

This invention is for a method of quantitatively removing mercury from aqueous waste streams with certain selected liquid organic amines. The method in its preferred form is particularly appropriate for removing mercury from aqueous brine solutions. Efficient and quantitative recovery of the extracted mercury is also provided.

2 Claims, No Drawings

EXTRACTION OF MERCURY FROM ALKALINE BRINES

BACKGROUND OF THE INVENTION

The invention described herein was made in the course of, or under, a contract with the U. S. Atomic Energy Commission.

The present invention relates to a process for the abatement of mercury pollution. More particularly, it relates to a method for the removal and efficient recovery of mercury from aqueous effluents generated by industrial processes. A major source of environmental mercury comes from the brine effluents issuing from chlor-alkali plants, aqueous effluents from paper and pulp mills, and from mercury ore beneficiation processes. A listing of mercury dischargers into public waters is found in ORNL NSF-EP-1, "Mercury in the Environment," a publication of the Oak Ridge National Laboratory, Oak Ridge, Tennessee. This publication documents the toxic effects of mercury upon man and his environment and points out the need for reducing the mercury level in man's total environment.

It is a general object of this invention to respond at least partially to this need by providing a process which allows quantitative removal and recovery of mercury from aqueous waste streams of the character described. A particular object of this invention is to remove and recover mercury from aqueous brine solutions.

THE PRIOR ART

Several methods are available for removing mercury from aqueous solutions. The precipitation of mercury by a more active metal such as aluminum, copper, iron, or zinc is effective, but it substitutes another metal in solution, usually in considerably more than an equivalent amount. There are methods which are based on the precipitation of mercuric sulfide, but these suffer from high toxicity and offensive odor of sulfide reagent. Sorption of mercury on preformed metal sulfides such as iron, cadmium, or zinc sulfides is available, but, as in the precipitation methods, it results in replacing the mercury with another metal ion.

Ion exchange methods which may be available are expensive and suffer from problems arising from resin attrition and fouling arising from suspended solids present in industrial solutions.

A limited class of organic analytical reagents such as dithizone are known to form organic complexes with mercury, but such reagents are expensive and chemically unstable.

Any promising pollution control process for removing mercury from aqueous solutions is one characterized by the use of a cheap, relatively available selective reagent for mercury which can quantitatively remove mercury from solution. While removal of the mercury is a technical requisite, a process which allows quantitative recovery of the mercury would be one which would most likely be accepted and used by those who discharge mercury-containing solutions into public streams. It is therefore an object of this invention to provide a process which allows for both removal and recovery of mercury from aqueous solutions and from industrial waste solutions.

STATEMENT OF THE INVENTION

According to this invention, efficient extraction of mercury from aqueous solutions can be effected by liquid-liquid solvent extraction utilizing an organic phase containing selected aqueous-insoluble high-molecular-weight organic amines as the selective extractants. The invention entails the use of selected liquid aqueous-insoluble primary, secondary, tertiary, and quaternary amines which extract at least 99 percent of the mercury from a mercury containing aqueous solution.

To be a practical industrial extractant the solvent must extract mercury from an alkaline or basic solution. Of the class of organic amines which effectively remove mercury at the 99-percent level, any of the class of quaternary amines to be described can extract mercury over a wide range of pH. On the other hand, the effectiveness of the primary, secondary, and tertiary amines is much more sensitive to the pH of the mercury-containing aqueous phase.

The mechanism responsible for the extractability of mercury apparently depends on the existence of mercury as an anionic mercuric complex which combines with the amine phase to form an aqueous-insoluble amine complex highly soluble in most organic solvents. The process of this invention is especially effective for the extraction of mercury from aqueous brine solutions. In such solutions, the mercury is already present in extractable form as the mercuric chloride complex $(HgCl_4)^{-2}$. Thus, no addition of chemicals or solution adjustments are necessary where the extractant is a quaternary amine chloride salt. All that is required is intimate contacting of the mercury-containing brine solution, by either mixer-settler or countercurrent techniques, with the amine phase dissolved in a hydrocarbon solvent such as xylene, diethylbenzene, or kerosene. Other useful diluents are chlorinated hydrocarbons, alcohols, and ketones.

Where the extractant is a quaternary amine chloride, the reaction can be visualized as involving:

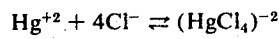

$$Hg^{+2} + 4Cl^- \rightleftarrows (HgCl_4)^{-2}$$

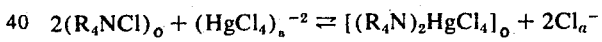

$$2(R_4NCl)_o + (HgCl_4)_a^{-2} \rightleftarrows [(R_4N)_2HgCl_4]_o + 2Cl_a^-$$

where:
  $R_4NCl$ = a quaternary amine chloride such as tricaprylmethylammonium chloride;
  $o$ = organic phase; and
  $a$ = aqueous phase.

DETAILED DESCRIPTION OF THE INVENTION

The quaternary amine chloride salts are prepared by mixing the free quaternary base with hydrochloric acid. Stock solutions 0.68 M dissolved in xylene and diethylbenzene were prepared by mixing the solution with equal volumes of 1 M HCl for several minutes. After centrifugation the organic phase was separated and used in the following examples in the original or diluted concentration. In the following examples an aqueous solution was spiked with mercury-203 tracer. 5 millimeters of the indicated aqueous phase was extracted at room temperature with equal volumes of the indicated organic phase by mixing the two phases using a high-speed motor-driven stirrer for 3-minute mixing periods. After extraction, the aqueous-organic mixture was centrifuged. Each phase was then analyzed for mercury-203 by counting 1-ml aliquots in a well-type gamma scintillation counter. Using this general procedure, the following examples illustrate a best mode of practicing the invention with a typical quaternary ammonium chloride salt.

EXAMPLE I

The extraction of mercury-203 with 30 percent weight by volume (W/V) tricapryl monomethyl ammonium chloride as a function of hydrochloric acid concentration is shown in Table I below. The designation Aliquot 336-S-Cl in the examples refers to the tricapryl monomethyl ammonium chloride salt available from General Mills, Inc., Kankakee, Illinois.

TABLE I

Extraction of $^{203}$Hg Tracer with 30%* Aliquot 336-S-Cl-Xylene as a Function of HCl Concentration

| HCl, M | $^{203}$Hg Tracer Extracted, % |
|---|---|
| 0.003 | 85.1 |
| 0.015 | 86.6 |
| 0.03 | 93.0 |
| 0.2 | 99.8 |
| 0.4 | 99.8 |
| 0.8 | >99.5 |
| 1.6 | >99.5 |
| 3.2 | >99.5 |
| 4.8 | >99.5 |
| 6.0 | 99.0 |
| 8.0 | 99.0 |
| 9.6 | 98.4 |

* weight %/by volume (e.g., 300 g. reagent per liter for 30% W/V)

It will be seen that at least 99 percent of Hg is extracted over a wide range of hydrochloric acid concentration. The decrease in mercury extraction at very dilute HCl concentrations is thought to occur because of the tendency to form water-soluble hydroxy species of mercury. However, this can be averted either by pretreatment of the extractant with HCl or by the addition of HCl or NaCl to the aqueous solution.

EXAMPLE II

The effect of sodium chloride concentration is shown in Table II below.

TABLE II

Extraction of $^{203}$Hg Tracer with 30% Aliquot 336-S-Cl-Xylene as a Function of NaCl Concentration

| Initial Aqueous Phase | | $^{203}$Hg Tracer Extracted, % |
|---|---|---|
| NaCl, M | HCl, M | |
| 0.1 | 0.03 | 99.0 |
| 0.5 | 0.03 | 99.2 |
| 1.0 | 0.03 | 99.6 |
| 2.0 | 0.03 | 99.9 |
| 3.0 | 0.03 | 99.9 |
| 3.5 | 0.03 | 99.6 |
| 4.0 | 0.03 | 99.7 |
| 5.2 | 0.03 | >99.9 |

It is seen that excellent recovery, greater than 99 percent, of the Hg-203 tracer was achieved over a wide range of sodium concentration in the aqueous phase. While these results were obtained with mixing periods of three minutes, I have obtained essentially equivalent results with mixing periods as short as 30 seconds, indicating that the extraction occurs rapidly.

EXAMPLE III

This example shows that macro concentrations of Hg will also extract quantitatively from aqueous solutions of hydrochloric acid and sodium chloride. Table III below summarizes results obtained with aqueous solutions containing various concentrations of mercury, HCl, and sodium chloride.

TABLE III

Extraction of Macro Concentrations of Mercury from Chloride Solutions with 30% Aliquot 336-S-Cl-Xylene

| Initial Aqueous Phase | | | Hg Extracted, % |
|---|---|---|---|
| NaCl, M | HCl, M | Hg, mg/ml | |
| — | 0.1 | 8 | 99.8 |
| — | 0.3 | 6 | 99.8 |
| — | 0.3 | 2 | 99.8 |
| — | 1.7 | 2 | 99.9 |
| — | 6.1 | 2 | >99.9 |
| — | 7.3 | 2 | 99.3 |
| 0.5 | 0.95 | 2 | 99.7 |
| 1.0 | 0.05 | 2 | 99.7 |
| 3.0 | 0.05 | 2 | 99.9 |
| 3.9 | 0.02 | 2 | >99.9 |
| 1.0 | 0.10 | 6 | 99.7 |
| 3.0 | 0.04 | 15.2 | >99.9 |

Further tests have shown that up to 75 milligrams of mercury per millimeter of extractant could be loaded into the organic phase. The amine:mercury mole ratio was about 2:1. The organic:aqueous ratio can be quite low (as low as 0.06) provided the amine:mercury molar ratio is at least 2.

EXAMPLE IV

The scope of inventive concept is not limited to the extraction of mercury from brine solutions or other chloride systems. Mercuric ion forms amine-extractable anionic species in other media such as in nitrate, sulfate, and phosphate aqueous media. However, on a mole-per-mole basis, the chloro complex of mercury is the more easily extractable. A comparison of the extraction of mercury with tricapryl monomethyl ammonium nitrate as compared to the chloride form of the same quaternary amine is shown in Table IV.

TABLE IV

Extraction of Mercury with 30% Aliquot 336-S-Xylene as a Function of HNO$_3$ Concentration

| HNO$_3$, M* | Hg Extracted, % | |
|---|---|---|
| | R$_4$NNO$_3$ | R$_4$NCl |
| 1.8 | 94.8 | 99.7 |
| 3.2 | 82.9 | 99.6 |
| 4.2 | 65.0 | 96.0 |
| 5.0 | 47.2 | 90.7 |
| 6.2 | 28.9 | 75.7 |

*Initial aqueous solutions contained 2 mg/ml Hg

It is seen that mercury extracts fairly well from dilute nitric acid solutions only and that, at a given nitric acid concentration, Hg extractability is greatly enhanced by use of the chloride salt of the amine.

EXAMPLE V

A practical industrial extractant for mercury should function equally well from alkaline as well as acidic brines. An important advantage of the quaternary amine chlorides is their ability to quantitatively extract mercury from aqueous brine solutions having a wide range of pH. This is shown in the results for the extraction of mercury as a function of pH of the brine solution.

TABLE V

Extraction of Mercury from Brine Solutions with 30% Aliquot 336-S-Cl-Xylene as a Function of pH

| Aqueous Phase* pH Initial | Final | Hg Extracted, % |
|---|---|---|
| 1.0 | 1.1 | 99.9 |
| 3.2 | 5.4 | 99.7 |
| 5.1 | 5.6 | 99.9 |
| 7.2 | 6.2 | 99.6 |
| 9.2 | 6.5 | 99.6 |
| 10.0 | 7.1 | 99.8 |
| 10.9 | 10.9 | 99.2 |
| 11.5 | 11.5 | 71.4 |

* Initial aqueous solutions contained 3 M NaCl and 2 mg/ml Hg

It is seen that more than 99 percent of the Hg was extracted from solutions ranging in pH from as low as 1 to as high as 10.9. The extraction of Hg from alkaline or acidic brine solutions of potassium chloride was found to be essentially identical to that found in the sodium chloride system. I have also achieved quantitative removal of mercury from sodium hypochlorite solutions.

Previous Examples I-V, inclusive, have been presented as an example of a best or preferred mode of practicing the invention—that is, by using the chloride salt of a quaternary amine. While tricapryl monomethyl ammonium chloride was used in these examples, it was used to represent the general class of quaternary amines which exhibit exceptional capacity to quantitatively extract mercury from acidic or basic brine solutions. The class of effective aqueous insoluble quaternary amines suitable for realizing the objects of this invention may be represented by the following generic formula:

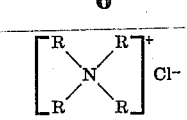

where $R$ represents a straight-chain or branched alkyl or aryl group. At least two of the hydrocarbon groups should contain from six to 18 carbons in the chain, the compounds being soluble in such organic solvents as xylene, diethylbenzene, and other hydrocarbon solvents. Particularly useful are those compounds in which three of the groups are saturated hydrocarbon chains containing eight to 10 carbon atoms each and the remaining group is a methyl group. Specific examples of quaternary ammonium salts are tricaprylmethylammonium chloride, trihexylmethylammonium chloride, trioctylmethylammonium chloride, tridecylmethylammonium chloride, distearyl dimethylammonium chloride, and lauryldimethyl benzylammonium chloride.

It should be understood that other high-molecular-weight (i.e., MW = 200-500) amine salts will be found to be effective in extracting mercury from aqueous solutions. While selected primary, secondary, and tertiary amines will extract mercury from acid solutions, their performance as selective, efficient mercury extractants at the 99 percent level in extracting mercury from basic solutions is not as good as the quaternary salts. While there is no definite basis for accounting for the varied extraction power of the primary, secondary, and tertiary amines in basic solutions, it seems plausible to assume that the amine salt form is not as stable in basic solutions and reacts to the less effective free base form.

The extraction of mercury from alkaline brine solutions in short-time contacts as a function of amine class is shown in Table VI.

TABLE VI

Extraction of Mercury from Alkaline Brine Solutions as a Function of Amine Class*

| No. | Chemical Name | Class | Aqueous pH Initial | Final | Hg Extracted, % |
|---|---|---|---|---|---|
| 1 | $RNH_2$, where R=mixture of isomers having 12-14 carbons, with t-alkyl groups[a] | Primary | 10.6 | 9.6 | >99.9 |
| 2 | $RNH_2$, where R=mixture of isomers having 18-22 carbons, with t-alkyl groups[b] | Primary | 10.5 | 9.5 | >99.9 |
| 3 | N-Dodecenyl(trialkylmethyl)-amine, trialkylmethyl-alkyl groups contain 12-15 carbons[c] | Secondary | 10.5 | 7.4 | 70.0 |
| 4 | N-Lauryl(trialkylmethyl)-amine- alkyl group contain 12-15 carbons[d] | Secondary | 10.5 | 9.4 | 15.0 |
| 5 | Tricaprylamine, $NR_3$; the R groups are a $C_8$-$C_{10}$ mixture[e] | Tertiary | 10.5 | 8.6 | 40.0 |
| 6 | Tricaprylmethylammonium chloride. $NR_3CH_3Cl$; R is a mixture of $C_8$-$C_{10}$ carbons[f] | Quaternary | 10.6 | 8.7 | >99.9 |
| 7 | Same as 1 (T) | Primary | 10.6 | 8.3 | >99.9 |
| 8 | Same as 2 (T) | Primary | 10.5 | 6.1 | 54.8 |
| 9 | Same as 3 (T) | Secondary | 10.6 | 2.2 | >99.9 |
| 10 | Same as 4 (T) | Secondary | 10.5 | 4.2 | >99.9 |
| 11 | Same as 5 (T) | Tertiary | 10.5 | 4.2 | >99.9 |
| 12 | Same as 6 (T) | Quaternary | 10.6 | 1.2 | >99.9 |

*Initial aqueous solutions contained 3 M NaCl and 2 mg/ml Hg.
(T)=amine extractant pretreated with 1 M HCl.
[a]Available as 30% Primene 81R from Rohm & Haas, Philadelphia, Pa.
[b]Available as 30% Primene JMT from Rohm & Haas, Philadelphia, Pa.
[c]Available as 30% Amberlite LA-1 from Rohm & Haas Co., Philadelphia, Pa.
[d]Available as 30% Amberlite LA-2 from Rohm & Haas Co., Philadelphia, Pa.
[e]Available as 30% Alamine 336-S from General Mills, Kankakee, Ill.
[f]Available as Aliquot 336-S from General Mills, Kankakee, Ill.

Regeneration of Quaternary Amine Solvent

For practical process application, a satisfactory extractant must be regenerated so that it can be recycled. The following example illustrates how the mercury can be recovered from the organic phase.

EXAMPLE VI (A) Aqueous Strippants

A number of aqueous solutions of inorganic and organic reagents were evaluated for their ability to strip mercury from xylene solutions containing 2 mg/ml mercury. The results are summarized in Table VII.

TABLE VII

Stripping of Mercury from Tricapryl Monomethyl Ammonium Chloride-Xylene Solution

| Strippant | | Hg Stripped, % Conc. of Amine Salt in Xylene | |
|---|---|---|---|
| | | 5% | 30% |
| $HNO_3$, M | 1 | <1.0 | <1.0 |
| | 3 | 12.0 | 0.4 |
| | 5 | 52.6 | 8.0 |
| | 6 | 71.6 | 17.0 |
| | 8 | 85.9 | 48.0 |
| | 10 | 88.8 | 76.0 |
| | 12 | 83.9 | 87.4 |
| $Na_2SO_3$, 1 M | | 55.0 | 41.1 |
| $Na_2S$, 1 M | | 98.1 | 90.6 |
| NaOH, 1 M | | 58.9 | 36.4 |
| $NH_4OH$, M | 0.1 | 89.5 | 5.9 |
| | 1 | 95.7 | 89.6 |
| | 5 | 96.3 | 96.7 |
| | 10 | >99.0 | 98.6 |
| | 15 | >99.0 | >99.0 |
| ethylenediamine, 2.5% | | >99.0 | >99.0 |
| propylenediamine, 2.5% | | >99.0 | >99.0 |

It will be noted that nitric acid stripped the mercury from the organic phase better than any other acidic reagent, but required a fairly high nitric acid molarity. Ammonium hydroxide stripped the mercury effectively, but some precipitate formed except at very high concentrations.

The best stripping agents were dilute aqueous solutions of ethylenediamine and propylenediamine. Greater than 99 percent of the mercury was easily stripped by each of these reagents without precipitation. Other organic diamines should strip the mercury with similar effectiveness.

EXAMPLE VII (B) Reduction-Precipitation of Mercury with Metal

An alternative method for stripping the mercury from the extractant is to precipitate the mercury directly by reduction with a more active metal. According to this aspect of the invention, such elements as aluminum, iron, copper, and zinc, preferably in finely divided form as turnings or as powder, will convert the mercury in the extractant directly to metallic mercury.

In a typical experiment a volume of 8 ml containing 2 mg/ml mercury was mixed for 3 minutes with 2.3 grams of aluminum turnings and then allowed to remain in contact an additional time. The results are shown in Table VIII.

TABLE VIII

Reduction-Precipitation of Mercury from 5% Tricapryl Monomethyl Ammonium Chloride-Diethyl Benzene by Aluminum

| Reduction Time, Min. | Hg Reduced, % |
|---|---|
| 3 | 2.0 |
| 10 | 8.1 |
| 25 | 22.5 |
| 40 | 35.9 |
| 60 | 46.9 |
| 75 | 65.0 |
| 90 | 77.0 |
| 105 | 83.4 |
| 135 | 90.3 |
| Overnight (18.5 hr.) | >98.0 |

The results show that most of the mercury was removed in 2 hours and essentially quantitative removal occurred after overnight contact. Faster reduction will occur with continuous mixing with aluminum shot or powder.

EXAMPLE VIII

This example is intended to demonstrate extraction and recovery of mercury from alkaline brine feed solution. The feed solution had a pH of 10.6, contained 3 M NaCl, 2 mg/ml mercury, as well as Hg tracer $5 \times 10^5$ gamma counts/min/ml. 20 milliliters of the alkaline brine solution was extracted with 20 ml of 5 percent tricapryl monomethyl ammonium chloride dissolved in diethylbenzene. The mercury was then stripped from the solvent by extracting for 3 minutes with 20 ml of an appropriate strippant. The strippants evaluated were 15 M $NH_4OH$, 2.5 percent ethylenediamine, and 2.5 percent propylenediamine.

The regenerated solvents were then used in a second cycle to extract fresh portions of the alkaline brine solution.

Concentrated ammonium hydroxide (15 M) stripped the mercury essentially quantitatively, but often a slight amount of mercury precipitated and material balances were poor. On the other hand, dilute aqueous solutions of ethylenediamine or propylenediamine quantitatively stripped the mercury from the solvent with no evidence of mercury precipitation. Typical results are shown in Table IX.

TABLE IX

Recovery of Mercury from Alkaline Brine Solutions with 5% Tricapryl Monomethyl Ammonium Chloride-Diethyl Benzene via Two-Cycle Process

| Process Step | Mercury Recovered, % | Aqueous pH Initial | Final |
|---|---|---|---|
| (Run No. 1) | | | |
| Initial Extraction | >99.9 | 10.6 | 1.9 |
| 2.5% ethylenediamine strippant | 99.6 | | |
| Second-cycle extraction | >99.9 | 10.6 | 10.7 |
| Second-cycle strippant | 99.6 | | |
| (Run No. 2) | | | |
| Initial Extraction | >99.9 | 10.6 | 1.9 |
| 2.5% propylenediamine strippant | 99.8 | | |
| Second-cycle extraction | 99.9 | 10.6 | 10.8 |
| Second-cycle strippant | 99.7 | | |

The data of Table IX for two runs using two effective strippants show the essentially complete removal and recovery of mercury from an aqueous brine solution. Because of the high extraction coefficient for mercury in a single stage, multiple extractions may not be necessary.

To summarize, I have shown that certain quaternary amine salts have extraordinary capacity to remove mercury from acidic as well as alkaline brine solutions. The capacity of these reagents to extract mercury satisfies the dual purpose of abatement of mercury pollution and the removal of mercury from brine and other aqueous chloride solutions. And the quantitative and efficient stripping action of the lower alkyl diamines, ethylenediamine and propylene diamine, allows recycling of the extractant and virtually complete recovery of mercury. The mercury can be converted to elemental form by destruction distillation of the diamine solution under reduced (subatmospheric) pressure. The process is technically effective, simple, and efficient and provides an economic incentive to the user since the mercury can be virtually completely recovered for reuse. And while the examples are directed to a demonstration of the efficacy of chloride salts, it is within the scope of this invention to employ nitrate, sulfate, phosphate salt forms where the circumstances require. For processing chloride solutions, however, the quaternary amine salts are the most economical and effective.

What is claimed is:

1. In the method of removing and recovering mercury from alkaline or acidic aqueous solution in which said solution is contacted with an organic phase consisting essentially of a quaternary amine salt and a solvent therefore, said amine salt having the general formula

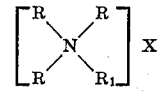

where $R$ represents a straight chain or branched chain alkyl or aryl hydrocarbon group, $R_1$ is methyl, a straight chain or branched chain alkyl or aryl hydrocarbon group, and $X$ represents Cl, or $SO_4$, or $NO_3$, or $PO_4$ anion, where at least two of the hydrocarbon groups contain from six to 18 carbon atoms, under such conditions as to effect transfer of the mercury into the organic phase, the improvement which comprises stripping the mercury from the organic phase with an aqueous solution of a strippant selected from the group consisting of ethylenediamine and propylenediamine.

2. The method according to claim 1 where $R$ = capryl and $R_1$ = methyl.

* * * * *